United States Patent
Mohammed et al.

(10) Patent No.: US 8,303,250 B2
(45) Date of Patent: Nov. 6, 2012

(54) METHOD AND APPARATUS FOR INCREASING LIFT ON WIND TURBINE BLADE

(75) Inventors: Omer Mohammed, Bangalore (IN); Stefan Herr, Greenville, SC (US)

(73) Assignee: General Electric Company, Schenectadt, NY (US)

( * ) Notice: Subject to any disclaimer, the term of this patent is extended or adjusted under 35 U.S.C. 154(b) by 27 days.

(21) Appl. No.: 12/649,682

(22) Filed: Dec. 30, 2009

(65) Prior Publication Data

US 2011/0135477 A1  Jun. 9, 2011

(51) Int. Cl.
B64C 9/00 (2006.01)
F03D 7/00 (2006.01)

(52) U.S. Cl. .................. 416/23; 416/231 B

(58) Field of Classification Search .......... 416/23, 416/24, 90 R, 91, 90 A, 231 R, 231 B
See application file for complete search history.

(56) References Cited

U.S. PATENT DOCUMENTS

| 1,770,575 | A | * | 7/1930 | Ksoll | 244/212 |
| 2,622,686 | A | * | 12/1952 | Chevreau et al. | 416/23 |
| 5,181,678 | A | | 1/1993 | Widnall et al. | |
| 5,320,491 | A | | 6/1994 | Coleman et al. | |
| 5,417,548 | A | | 5/1995 | Tangler et al. | |
| 6,068,446 | A | | 5/2000 | Tangler et al. | |
| 6,905,092 | B2 | * | 6/2005 | Somers | 244/3 |
| 7,059,833 | B2 | | 6/2006 | Stiesdal et al. | |
| 7,604,461 | B2 | | 10/2009 | Bonnet | |
| 2009/0123289 | A1 | | 5/2009 | Tangler et al. | |
| 2010/0143152 | A1 | * | 6/2010 | Subramanian et al. | 416/90 R |

FOREIGN PATENT DOCUMENTS

GB 2185788 A * 7/1987

\* cited by examiner

Primary Examiner — Edward Look
Assistant Examiner — Ryan Ellis
(74) Attorney, Agent, or Firm — James McGinness; Armstrong Teasdale LLP

(57) ABSTRACT

A lift generating apparatus for a wind turbine rotor blade comprising a first sidewall and an opposing second sidewall coupled together at a leading edge and at a trailing edge. The lift generating apparatus includes at least one forward blade extension coupled to the rotor blade to define a first airflow channel between the forward blade extension and the rotor blade. The lift generating apparatus also includes at least one aft blade extension coupled to the rotor blade to define a second airflow channel between the aft blade extension and the rotor blade.

16 Claims, 6 Drawing Sheets

METHOD AND APPARATUS FOR INCREASING LIFT ON WIND TURBINE BLADE

BACKGROUND OF THE INVENTION

The subject matter described herein relates generally to wind turbines and, more particularly, to a method and apparatus for increasing lift on a wind turbine blade.

Wind turbines convert the kinetic energy of wind into electrical energy. Wind turbines include one or more blades that rotate when oncoming wind strikes the blades. The flow of wind over the wind turbine blades generates lift and provides torque to generate power. As such, the amount of energy that a wind turbine can extract from the wind is directly related to the lift generated on the blades. The amount of lift generated on the blades depends on a number of factors. These factors include a speed of the wind, a lift coefficient of the blades, a planform area of the blades, and an air density of the wind.

One technique that is used to increase lift, and thereby increase energy extracted by the wind turbine, is to increase the planform area of the blades. However, larger blades are more expensive, and may present structural issues in the wind turbine due to their greater weight. An additional technique for increasing lift is to pitch the blades such that an angle of attack is increased, thus increasing the lift coefficient. However, increasing the angle of attack above a critical angle of attack may result in air flow separation over the blades, thus stalling the blades. When stall occurs, lift generated by the blades decreases significantly and a large component of the torque is lost.

BRIEF DESCRIPTION OF THE INVENTION

In one embodiment, a lift generating apparatus for a wind turbine rotor blade comprising a first sidewall and an opposing second sidewall coupled together at a leading edge and at a trailing edge is provided. The lift generating apparatus includes at least one forward blade extension coupled to the rotor blade to define a first airflow channel between the forward blade extension and the rotor blade. The lift generating apparatus also includes at least one aft blade extension coupled to the rotor blade to define a second airflow channel between the aft blade extension and the rotor blade.

In another embodiment, a wind turbine is provided that includes a tower, a nacelle coupled to the tower, and a rotor rotatably coupled to the nacelle. The rotor includes at least one blade including a first sidewall and an opposing second sidewall coupled together at a leading edge and at a trailing edge. The rotor also includes at least one forward blade extension coupled to the blade to define a first airflow channel between the forward blade extension and the blade and at least one aft blade extension coupled to the blade to define a second airflow channel between the aft blade extension and the blade.

In yet another embodiment, a method for assembling a wind turbine is provided that includes coupling at least one forward blade extension to at least one blade having a first sidewall and an opposing second sidewall coupled together at a leading edge and at a trailing edge, to define a first airflow channel between the forward blade extension and the blade. The method also includes coupling at least one aft blade extension to the blade to define a second airflow channel between the aft blade extension and the blade, and coupling the blade to the wind turbine.

DETAILED DESCRIPTION OF THE INVENTION

The embodiments described herein provide an efficient device for increasing lift for wind turbine blades. A forward blade extension is coupled to or near a leading edge of a wind turbine blade, and an aft blade extension is coupled to or near a trailing edge of the wind turbine blade. A first airflow channel is defined between the forward blade extension and the wind turbine blade, and a second airflow channel is defined between the aft blade extension and the wind turbine blade. The forward blade extension directs air through the first airflow channel to provide additional lift to the wind turbine blade and to reduce airflow separation that may occur along a suction surface of the wind turbine blade. The aft blade extension directs air through the second airflow channel to provide additional lift to the wind turbine blade.

Figure 1:
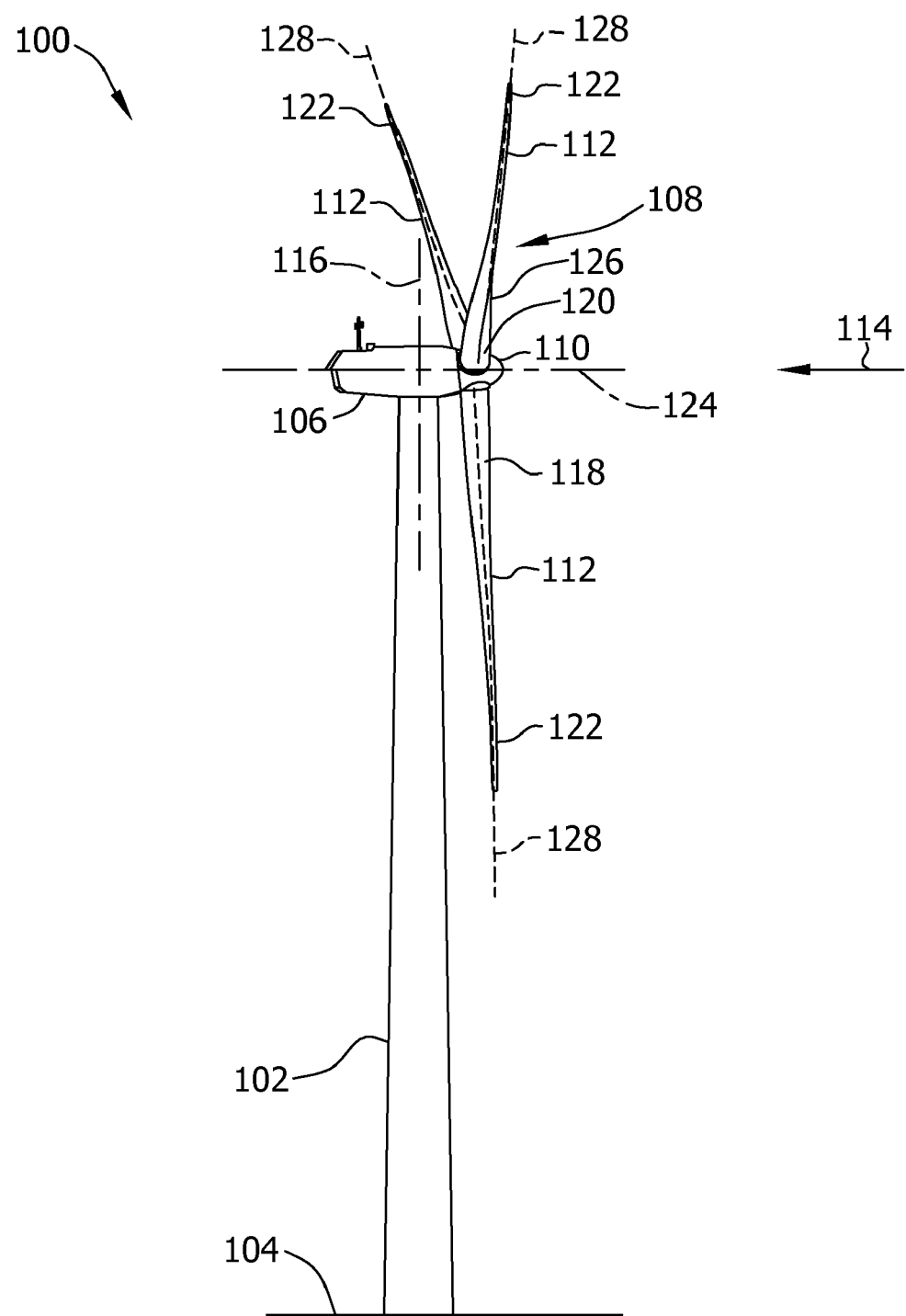
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to the direction of wind 114. Rotor blades 112 are mated to hub 110 by coupling a blade root portion 118 to hub 110 at a plurality of load transfer regions 120. Load transfer regions 120 each have a hub load transfer region and a blade load transfer region (both not shown in FIG. 1). Loads induced to rotor blades 112 are transferred to hub 110 via load transfer regions 120. Each rotor blade 112 also includes a blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, blade lift forces are induced to rotor blade 112 and rotation of rotor 108 about an axis of rotation 124 is induced as blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of blade surface area 126 exposed to wind 114 and, conversely, decreasing a pitch angle of rotor blade 112 increases an amount of blade surface area 126 exposed to wind 114. The pitch angles of rotor blades 112 are adjusted about a pitch axis 128 at each rotor blade 112. In the exemplary embodiment, the pitch angles of rotor blades 112 are controlled individually. Alternatively, the pitch angles of rotor blades 112 are controlled as a group.

Figure 2:
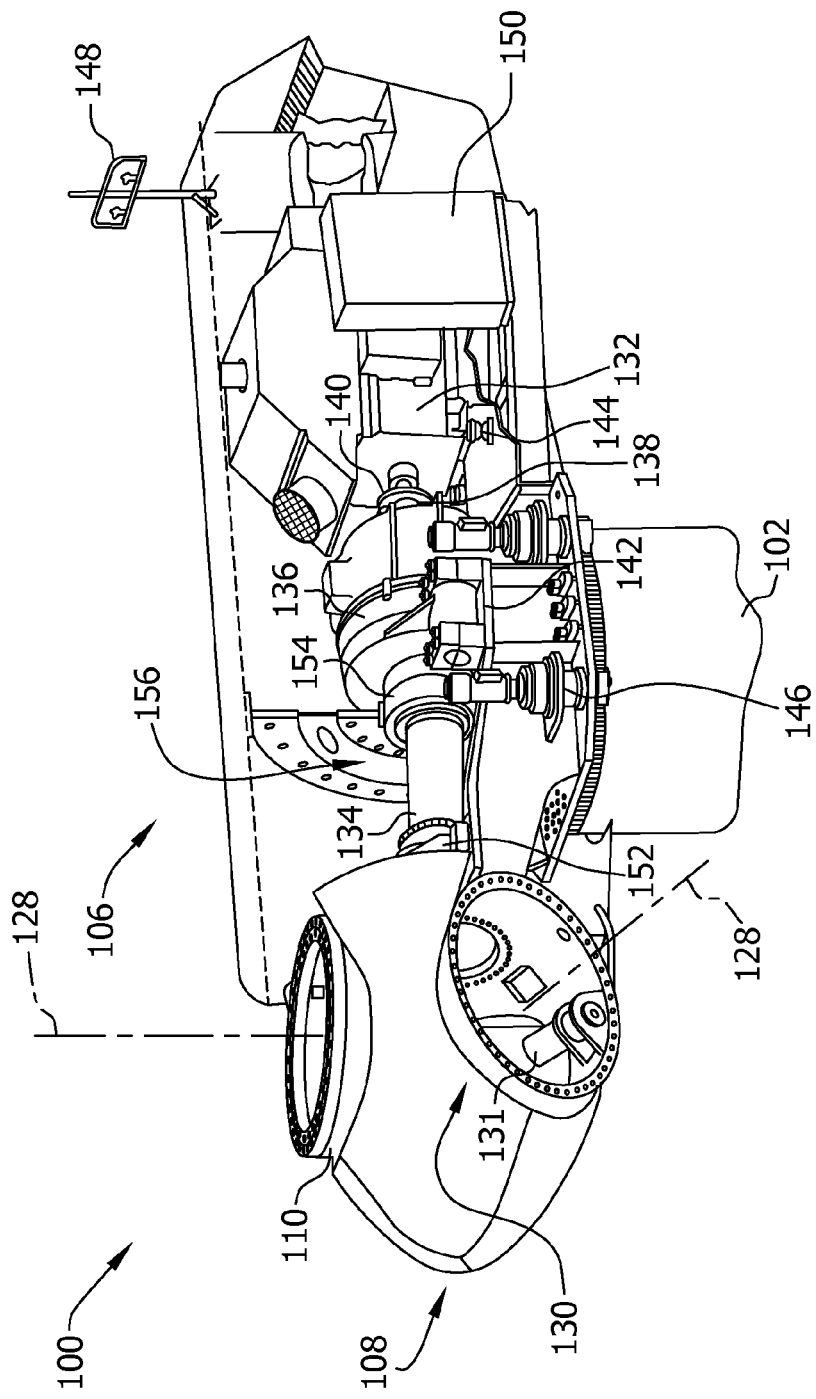
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, mast 148 provides information, including wind direction and/or wind speed, to a control system 150. Control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, control system 150 may execute a SCADA (Supervisory, Control and Data Acquisition) program.

Pitch assembly 130 is operatively coupled to control system 150. In the exemplary embodiment, nacelle 106 also includes forward support bearing 152 and aft support bearing 154. Forward support bearing 152 and aft support bearing 154 facilitate radial support and alignment of rotor shaft 134.

Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
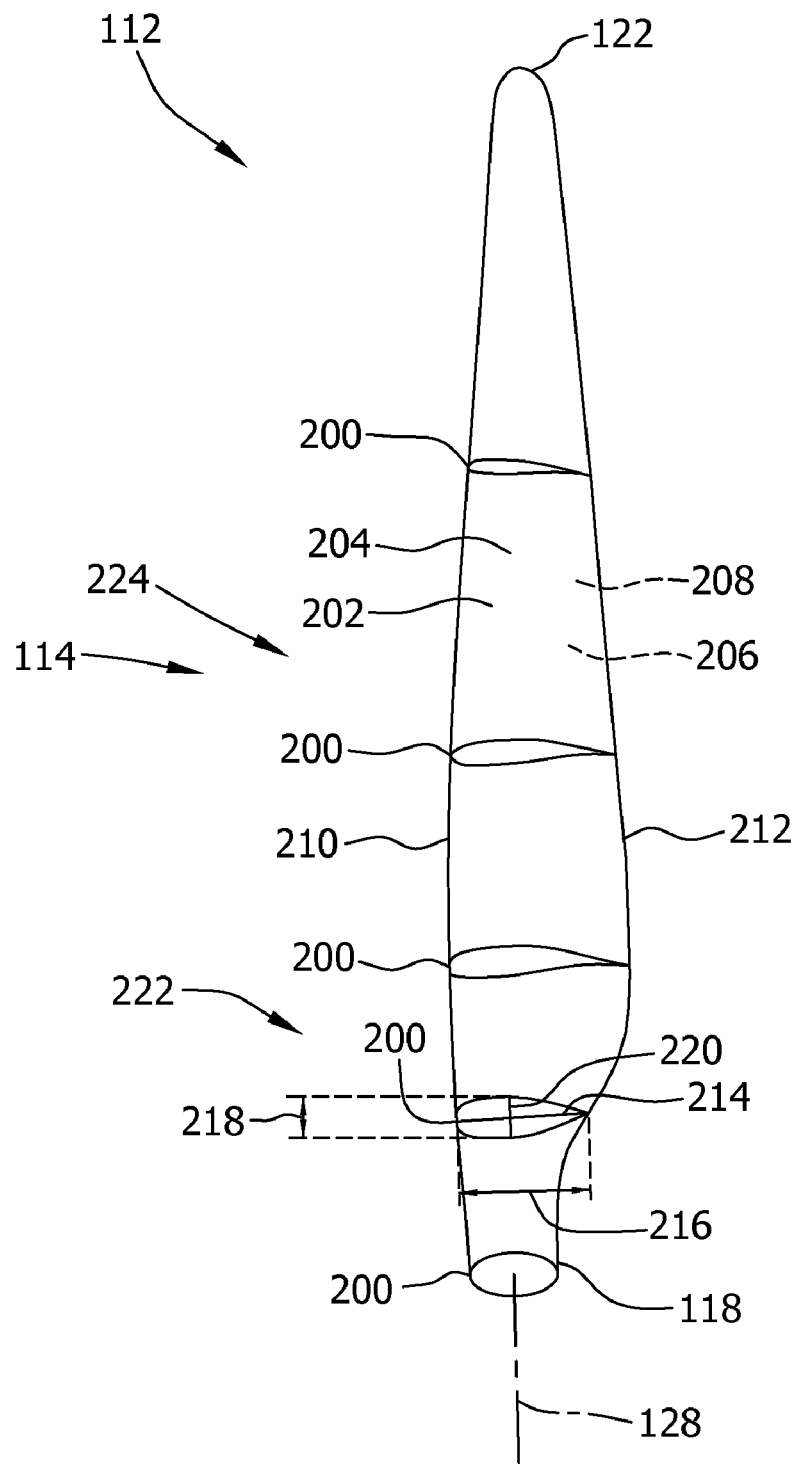
FIG. 3 is a perspective view of an exemplary rotor blade suitable for use with the wind turbine shown in FIG. 1.

FIG. 3 shows a perspective view of rotor blade 112 and a plurality of cross-sectional profiles 200 of rotor blade 112. In the exemplary embodiment, rotor blade 112 includes a first sidewall 202 that forms a suction surface 204 and an opposite second sidewall 206 that forms a pressure surface 208 of rotor blade 112. First sidewall 202 is coupled to second sidewall 206 along a leading edge 210 and along an opposing trailing edge 212 to facilitate forming a substantially airfoil-shaped cross-sectional profile 200. Leading edge 210 and trailing edge 212 extend from blade root portion 118 to blade tip portion 122. During operation, pitch assembly 130 (shown in FIG. 2) positions rotor blade 112 such that leading edge 210 is substantially directed towards wind 114, and trailing edge 212 is substantially directed away from wind 114. A chord line 214 is defined between leading edge 210 and trailing edge 212, and a width of rotor blade 112 is equal to a chord length 216 of chord line 214. A thickness 218 of rotor blade 112 is defined by measuring the largest cross-sectional distance between first sidewall 202 and second sidewall 206 with a line 220 perpendicular to chord line 214.

A cross-sectional shape of rotor blade 112 changes as rotor blade 112 extends axially from blade root portion 118 to blade tip portion 122. More specifically, at or near blade root portion 118, rotor blade 112 has a substantially circular cross-sectional profile 200 and chord length 216 is substantially equal to blade thickness 218. In a transitional area 222, rotor blade 112 has a substantially expanded airfoil-shaped cross-sectional profile 200. As rotor blade 112 extends towards a lift maximizing area 224 and further towards blade tip portion 122, the cross-sectional profile 200 of rotor blade 112 generally tapers into a narrow airfoil-shaped cross-sectional profile 200 having a decreasing chord length 216 and blade thickness 218. Moreover, as shown in FIG. 3, blade thickness 218 is generally largest near leading edge 210, and reduces in size radially towards trailing edge 212. As used herein, the term "axial" or "axially" refers to a direction along or substantially parallel to pitch axis 128. As used herein, the term "radial" or "radially" refers to a direction substantially perpendicular to pitch axis 128 and substantially parallel to chord line 214.

Figure 4:
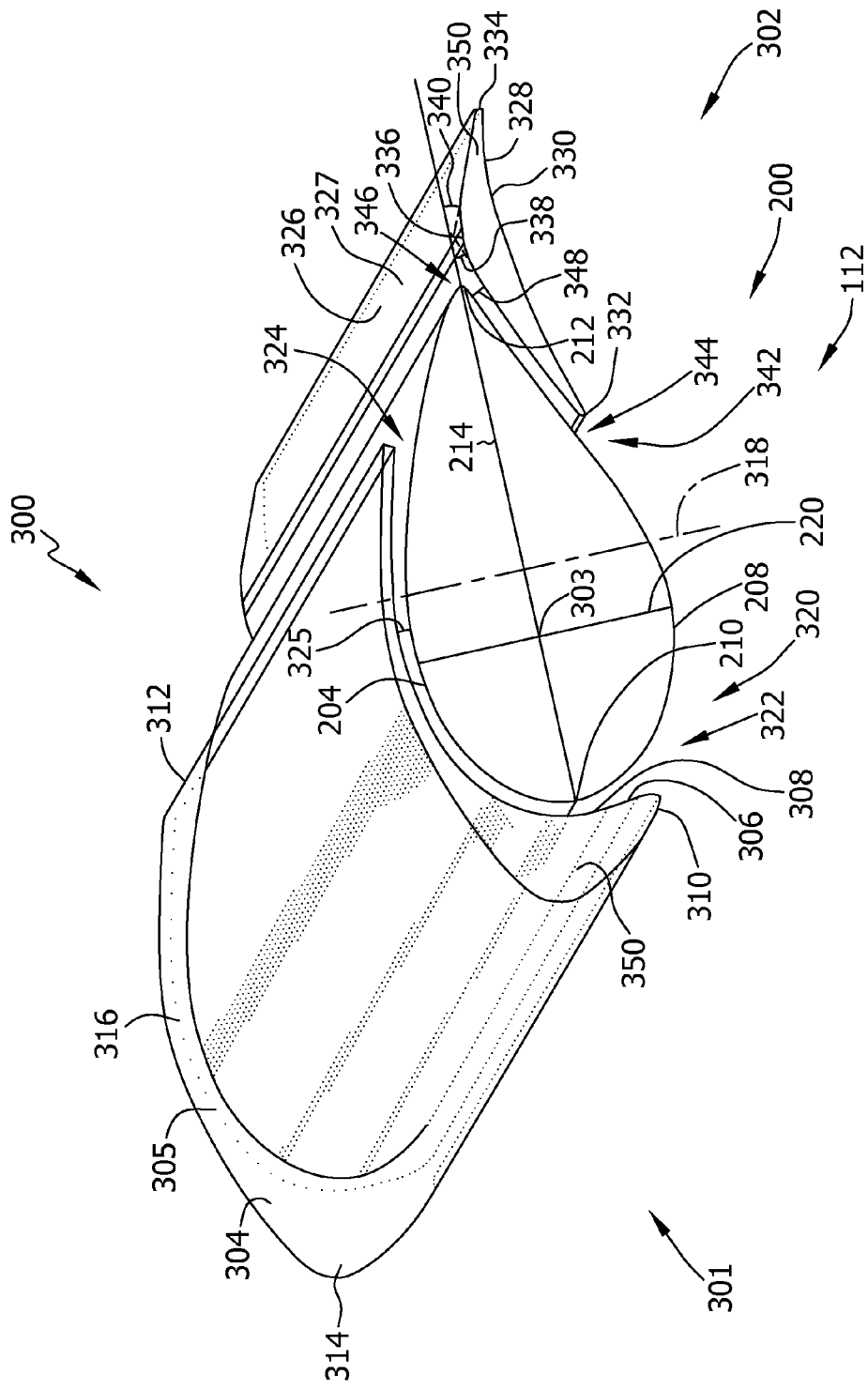
FIG. 4 is a perspective cross-sectional view of a portion of an exemplary lift generating apparatus suitable for use with the wind turbine shown in FIG. 1.
Figure 5:
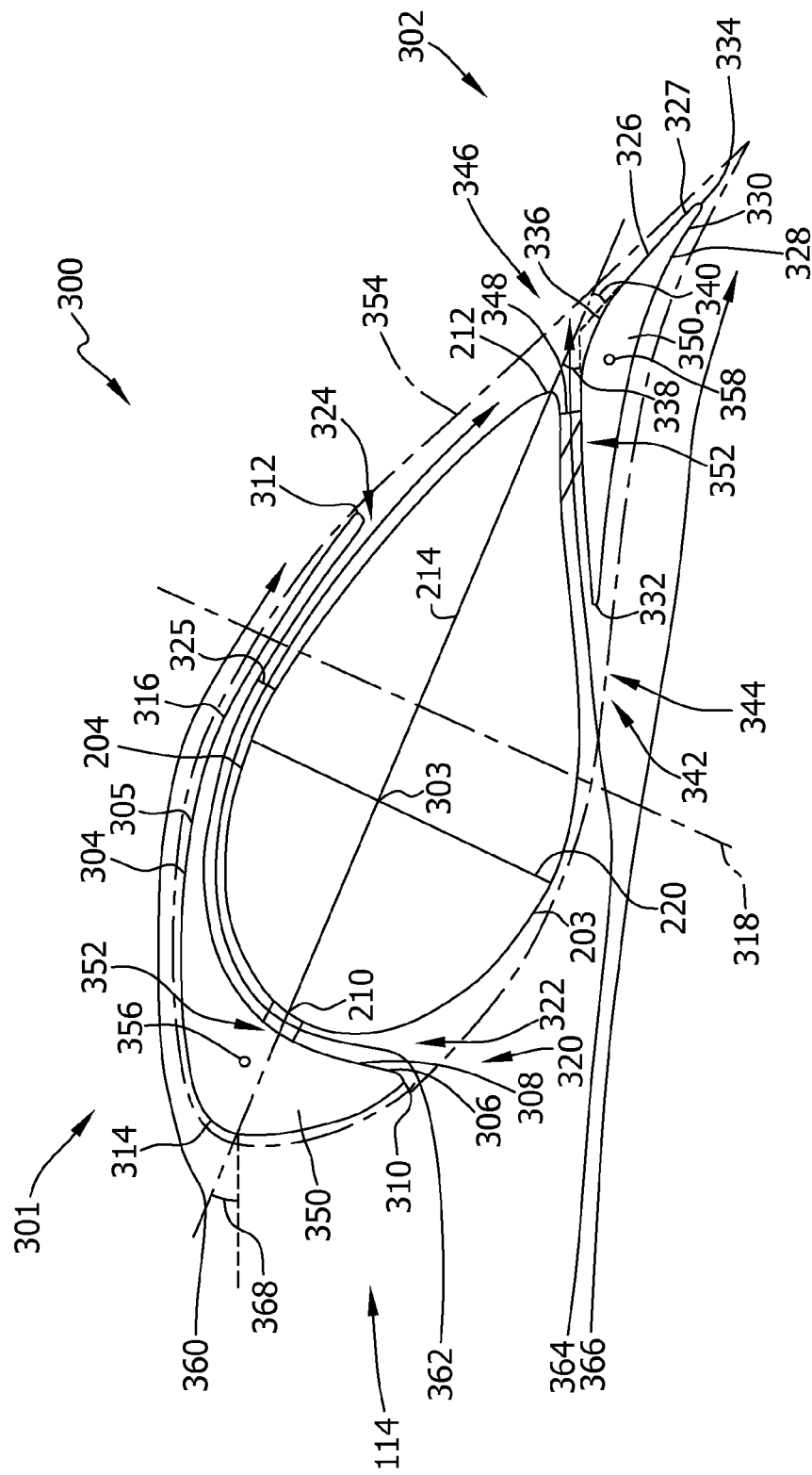
FIG. 5 is a side cross-sectional view of the lift generating apparatus shown in FIG. 4.

FIG. 4 shows a perspective cross-sectional view of a portion of an exemplary lift generating apparatus 300 that includes a forward blade extension 301 and an aft blade extension 302. FIG. 5 shows a side cross-sectional view of lift generating apparatus 300 including forward blade extension 301 and aft blade extension 302. While FIGS. 4 and 5 show forward blade extension 301 and aft blade extension 302 coupled to a portion of rotor blade 112 having a cross-sectional profile 200 similar to a cross-sectional profile 200 near transitional area 222 (shown in FIG. 3), forward blade extension 301 and/or aft blade extension 302 may be coupled to any suitable portion of rotor blade 112. For example, forward blade extension 301 and/or aft blade extension 302 may be coupled to root portion 118 (shown in FIG. 1), transitional area 222, and/or to lift maximizing area 224 (shown in FIG. 3). Moreover, rotor blade 112 may include a plurality of forward blade extensions 301 and/or aft blade extensions 302. For example, separate forward blade extensions 301 and/or aft blade extensions 302 may be coupled at a plurality of locations along or near blade leading edge 210 and/or blade trailing edge 212. While FIG. 4 shows forward blade extension 301 and aft blade extension 302 extending axially across a portion of rotor blade 112, forward blade extension 301 and/or aft blade extension 302 may extend a greater distance or a lesser distance axially along rotor blade 112 as desired.

As used herein, the term "vertical" or "vertically" refers to a direction substantially parallel to line 220 of rotor blade 112. The term "upward" refers to a vertical direction viewed from pressure surface 208 towards suction surface 204. As used herein, the term "downward" refers to a vertical direction viewed from suction surface 204 towards pressure surface 208. An intersection of chord line 214 and line 220 defines a center 303 of cross-sectional profile 200. As used herein, the term "outward" refers to a direction away from center 303 of rotor blade 112, and the term "inward" refers to a direction towards center 303.

In the exemplary embodiment, forward blade extension 301 includes a first sidewall 304 that defines a suction surface 305 and a second sidewall 306 that defines an opposing pressure surface 308. Alternatively, forward blade extension 301 may include any suitable number of sidewalls that define suction surface 305 and/or pressure surface 308. In the exemplary embodiment, first sidewall 304 and second sidewall 306 are coupled together along a pressure edge 310 and along a trailing edge 312. Suction surface 305 extends upward and radially outward from pressure edge 310 to a leading edge 314 of forward blade extension 301. At leading edge 314, suction surface 305 extends upward and radially inward to an apex 316 of forward blade extension 301. Suction surface 305 extends past apex 316 downward and radially outward towards trailing edge 212 of rotor blade 112. Suction surface 305 ends or terminates at trailing edge 312 before reaching trailing edge 212 of rotor blade 112. In the exemplary embodiment, forward blade extension 301 extends towards trailing edge 312 past a vertical centerline 318 of rotor blade 112 (i.e., a line extending through the midpoint of chord line 214 and substantially parallel to line 220). In one embodiment, forward blade extension 301 extends to or past trailing edge 312. Alternatively, forward blade extension 301 extends towards, but does not reach, centerline 318. Suction surface 305 may have any suitable shape and/or configuration.

In the exemplary embodiment, pressure surface 308 has a substantially similar shape as leading edge 210 and suction surface 204 of rotor blade 112. Pressure surface 308 extends only minimally radially outward towards leading edge 314 before curving radially inward towards apex 316 and towards trailing edge 312. Pressure surface 308 has a substantially arcuate shape, and defines a forward airflow channel 320 in cooperation with rotor blade 112. Forward airflow channel 320 includes a forward airflow channel inlet 322 defined between pressure edge 310 and pressure surface 208 of rotor blade 112. Forward airflow channel 320 extends between pressure surface 308 and pressure surface 208 of rotor blade 112, and continues past leading edge 210 to suction surface 204 of rotor blade 112. Forward airflow channel 320 extends between pressure surface 308 and suction surface 204 past centerline 318, and forward airflow channel 320 ends at a forward airflow channel outlet 324 proximate trailing edge 312 of forward blade extension 301. It should be noted that although forward airflow channel 320 terminates at forward airflow channel outlet 324, air flowing through forward airflow channel 320 may continue to flow along suction surface 204 of rotor blade 112 towards and/or past trailing edge 212.

In the exemplary embodiment, forward blade extension 301, and specifically pressure surface 308, substantially matches a contour of rotor blade 112, such that forward airflow channel 320 has a substantially uniform width 325 from forward airflow channel inlet 322 to forward airflow channel outlet 324. Alternatively, forward blade extension 301 may diverge and/or converge with respect to the contour of rotor blade 112, such that width 325 increases and/or decreases as forward blade extension 301 traverses suction surface 204 and/or pressure surface 208.

In the exemplary embodiment, aft blade extension 302 includes a first sidewall 326 that defines a suction surface 327 and a second sidewall 328 that defines an opposing pressure surface 330. Alternatively, aft blade extension 302 may include any suitable number of sidewalls that define suction surface 327 and/or pressure surface 330. In the exemplary embodiment, first sidewall 326 and second sidewall 328 are coupled together along a leading edge 332 and along a trailing edge 334. Suction surface 327 extends upward and radially outward from leading edge 332 to an apex 336 of aft blade extension 302 at an angle 338 with respect to chord line 214. At apex 336, suction surface 327 extends radially outward and substantially parallel to chord line 214 of rotor blade 112. Suction surface 327 then extends downward and radially outward to trailing edge 334 of aft blade extension 302 at an angle 340 with respect to chord line 214. In one embodiment, angle 338 is substantially similar to angle 340. Alternatively, angle 338 is greater than or less than angle 340. In the exemplary embodiment, aft blade extension 302 is positioned at least partially underneath pressure surface 208 of rotor blade 112 such that at least a portion of suction surface 327 of aft blade extension 302 extends underneath pressure surface 208 of rotor blade 112. As such, at least a portion of suction surface 327 extends radially inward past trailing edge 212 of rotor blade 112 and approaches, but does not reach centerline 318 of rotor blade 112. Alternatively, aft blade extension 302 extends to or past centerline 318. Moreover, in the exemplary embodiment, at least a portion of suction surface 327 extends radially outward from trailing edge 212 of rotor blade 112. In one embodiment, apex 336 and/or a portion of suction surface 327 radially outward from apex 336 extends radially outward from trailing edge 212 of rotor blade 112. In the exemplary embodiment, pressure surface 330 extends from leading edge 332 to trailing edge 334 in a substantially arcuate shape. Alternatively, pressure surface 330 has a substantially linear shape. Suction surface 327, pressure surface 330, and/or aft blade extension 302 may have any suitable shape and/or configuration.

An aft airflow channel 342 is defined between suction surface 327 of aft blade extension 302 and pressure surface 208 of rotor blade 112. Aft airflow channel 342 includes an aft airflow channel inlet 344 defined between pressure surface 208 of rotor blade 112 and leading edge 332 of aft blade extension 302. Aft airflow channel 342 extends between pressure surface 208 of rotor blade 112 and suction surface 327, and ends or terminates at an aft airflow channel outlet 346 near trailing edge 212 of rotor blade 112. It should be noted that although aft airflow channel 342 terminates at aft airflow channel outlet 346, air flowing through aft airflow channel 342 may continue to flow along suction surface 327 of aft blade extension towards and/or past trailing edge 334.

In the exemplary embodiment, suction surface 327 of aft blade extension 302 near aft airflow channel 342 substantially matches a contour of rotor blade 112 such that aft airflow channel 342 has a substantially uniform width 348 from aft airflow channel inlet 344 to aft airflow channel outlet 346. Alternatively, aft blade extension 302 may diverge and/or converge with respect to the contour of rotor blade 112 such that width 348 increases and/or decreases as suction surface 327 of aft blade extension 302 traverses pressure surface 208.

In one embodiment, a plurality of forward blade extensions 301 and/or a plurality of aft blade sections 302 are coupled together and/or to rotor blade 112. In such an embodiment, a first forward blade extension (not shown) is coupled to rotor blade 112, and a second forward blade extension (not shown) is coupled to the first forward blade extension. Additional forward blade extensions 301 may be added in a similar manner. Likewise, a first aft blade extension (not shown) is coupled to rotor blade 112, and a second aft blade extension (not shown) is coupled to the first aft blade extension. Additional aft blade extensions 302 may be added in a similar manner.

Referring to FIG. 5, forward blade extension 301 and aft blade extension 302 may be formed of one or more suitable materials, such as, for example, a composite, aluminum, steel, or plastic material or any combination thereof. Moreover, forward blade extension 301 and/or aft blade extension 302 may be formed with a hollow or solid interior 350. Forward blade extension 301 and/or aft blade extension 302 may be coupled to rotor blade 112 using bolts and rods, or any suitable coupling mechanism 352. Forward blade extension 301 is coupled across leading edge 210 and aft blade extension 302 is coupled to pressure surface 208 proximate trailing edge 212 of rotor blade 112 by coupling mechanism 352. Alternatively, forward blade extension 301 may be coupled to any suitable location on pressure surface 208 and/or suction surface 204 of rotor blade 112 by coupling mechanism 352, and aft blade extension 302 may be coupled to any suitable location on pressure surface 208 and/or suction surface 204 of rotor blade 112 by coupling mechanism 352. Forward blade extension 301, rotor blade 112, and aft blade extension 302 form a substantially airfoil-shaped aerodynamic cross-section 354 shown by a phantom line in FIG. 5. Alternatively, forward blade extension 301, rotor blade 112, and aft blade extension 302 form any suitably-shaped aerodynamic cross-section 354.

Moreover, existing wind turbines may be retrofitted with lift generating apparatus 300. One or more forward blade extensions 301 and/or aft blade extensions may be coupled to one or more rotor blades of existing wind turbines using coupling mechanism 352 or any suitable mechanism.

In the exemplary embodiment, forward blade extension 301 and aft blade extension 302 are fixedly coupled to rotor blade 112. In an alternative embodiment, forward blade extension 301 and/or aft blade extension 302 are retractable and/or pivotable about a forward pivot axis 356 and/or an aft pivot axis 358. As such, forward airflow channel 320 and/or aft airflow channel 342 is adjustable, such as by increasing or decreasing width 325 along at least a portion of forward airflow channel 320 and/or width 348 along at least a portion of aft airflow channel 342. In such an embodiment, control system 150 (shown in FIG. 2), or another suitable control system and/or controller, controls a retraction, an extension, and/or a pivot of forward blade extension 301 and/or a retraction, an extension, and/or a pivot of aft blade extension 302.

Referring further to FIG. 5, in the exemplary embodiment, wind 114 flows towards rotor blade 112 and is diverted by forward blade extension 301, rotor blade 112, and/or aft blade extension 302. A first airflow 360 is directed across suction surface 305 of forward blade extension 301 after reaching leading edge 314. First airflow 360 flows substantially along suction surface 305 and facilitates creating a low air pressure above suction surface 305 due to a camber of forward blade extension 301. As such, first airflow 360 facilitates adding lift to rotor blade 112 and to forward blade extension 301. A second airflow 362 is directed into forward airflow channel inlet 322, through forward airflow channel 320, and out of forward airflow channel outlet 324. Second airflow 362 flows across suction surface 204 of rotor blade 112 and across at least a portion of suction surface 327 of aft blade extension 302. Second airflow 362 facilitates adding lift to rotor blade 112 and facilitates reducing airflow separation that may occur along suction surface 204 of rotor blade 112. A third airflow 364 is directed underneath forward blade extension 301 and across pressure surface 208 of rotor blade 112. Third airflow 364 enters aft airflow channel inlet 344, is channeled through aft airflow channel 342, and exits through aft airflow channel outlet 346. Third airflow 364 flows across suction surface 327 of aft blade extension 302 and facilitates creating a low air pressure above suction surface 327. Third airflow 364 also facilitates creating a high air pressure below pressure surface 208 of rotor blade 112 and adds lift to rotor blade 112 and to aft blade extension 302. A fourth airflow 366 is directed underneath forward blade extension 301, across pressure surface 208 of rotor blade 112, and across pressure surface 330 of aft blade extension 302. Fourth airflow 366 facilitates creating high air pressure below pressure surface 208 of rotor blade 112 and pressure surface 330 of aft blade extension. Fourth airflow 366 facilitates adding lift to rotor blade 112 and to aft blade extension 302. As such, forward blade extension 301 and aft blade extension 302 facilitate adding lift to rotor blade 112 and facilitate reducing airflow separation across suction surface 204 of rotor blade 112. Because airflow separation is reduced, an angle of attack 368 of rotor blade 112 may be increased, and additional lift may be induced to rotor blade 112 by wind 114.

Figure 6:
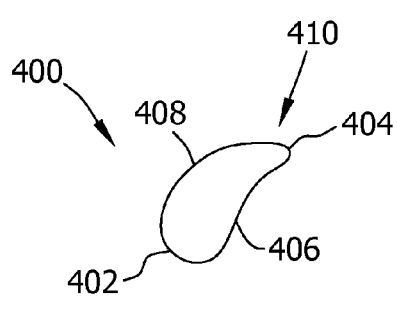
FIGS. 6 and 7 are cross-sectional views of alternative forward blade extensions suitable for use with the lift generating apparatus shown in FIGS. 4 and 5.

FIG. 6 shows an alternative forward blade extension 400 that is configured in a substantial airfoil shape. As such, a leading edge 402, an opposing trailing edge 404, a pressure surface 406, and an opposing suction surface 408 of forward blade extension 400 are substantially curvilinear. Although not shown in FIG. 6, an end portion 410 proximate trailing edge 404 of forward blade extension 400 may be elongated such that end portion 410 extends across suction surface 204 of rotor blade 112 (both shown in FIG. 2) when coupled to rotor blade 112 in a similar manner as shown in FIGS. 4 and 5. During operation, the curvilinear shape of leading edge 402 facilitates reducing a formation of one or more vortexes near pressure surface 406 and facilitates increasing lift induced to forward blade extension 400. In other respects, forward blade extension 400 operates in a similar manner as forward blade extension 301 (shown in FIG. 4).

Figure 7:
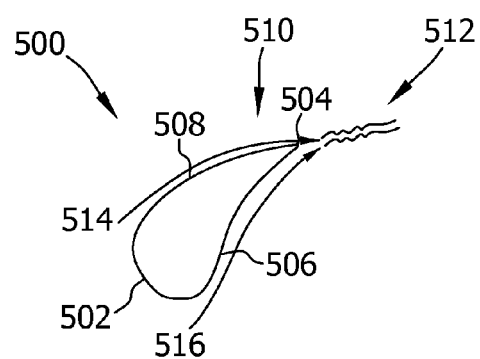

FIG. 7 shows an alternative forward blade extension 500 that is configured in a substantial airfoil shape. Forward blade extension 500 has a leading edge 502, an opposing trailing edge 504, a pressure surface 506, and an opposing suction surface 508 of forward blade extension 500. Trailing edge 504 is substantially V-shaped, and leading edge 502, pressure surface 506, and suction surface 508 are substantially curvilinear. Although not shown in FIG. 7, an end portion 510 proximate trailing edge 504 of forward blade extension 500 may be elongated such that end portion 510 extends across suction surface 204 of rotor blade 112 (both shown in FIG. 2) when coupled to rotor blade 112 in a similar manner as shown in FIGS. 4 and 5. During operation, the curvilinear shape of leading edge 502 facilitates reducing a formation of one or more vortexes near leading edge 502 and facilitates increasing lift induced to forward blade extension 500. The V-shape of trailing edge 504 reduces an airflow wake 512 as a first airflow 514 meets a second airflow 516 downstream of trailing edge 504. As such, a noise that may be generated by first airflow 514 and/or second airflow 516 is reduced, and airflow wake 512 reduces an interruption of airflow across suction surface 204 of rotor blade 112. In other respects, forward blade extension 500 operates in a similar manner as forward blade extension 301 (shown in FIG. 4).

Figure 8:
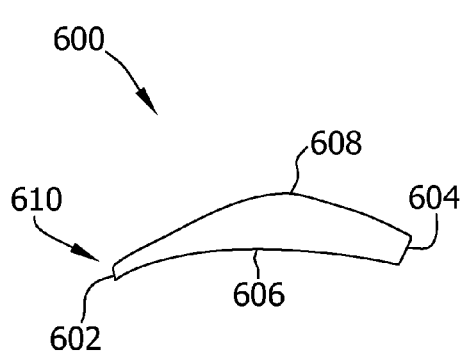
FIGS. 8 and 9 are cross-sectional views of alternative aft blade extensions suitable for use with the lift generating apparatus shown in FIGS. 4 and 5.

FIG. 8 shows an alternative aft blade extension 600 that has a leading edge 602, an opposing trailing edge 604, a pressure surface 606, and an opposing suction surface 608. Pressure surface 606 and suction surface 608 are substantially curvilinear. Leading edge 602 and trailing edge 604 are substantially linear, and leading edge 602 forms a substantially narrow profile 610. During operation, narrow profile 610 of leading edge 602 and the curvilinear shape of suction surface 608 facilitate reducing an airflow separation and a formation of one or more vortexes near suction surface 608. In other respects, aft blade extension 600 operates in a similar manner as aft blade extension 302 (shown in FIG. 4).

Figure 9:
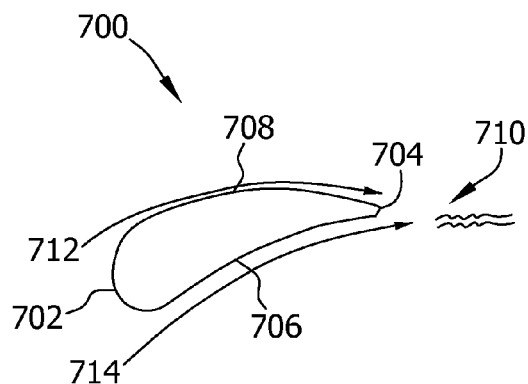

FIG. 9 shows an alternative aft blade extension 700 that is configured in a substantial airfoil shape. As such, a leading edge 702, an opposing trailing edge 704, a pressure surface 706, and an opposing suction surface 708 of aft blade extension 700 are substantially curvilinear. Alternatively, trailing edge 704 is substantially V-shaped. During operation, the curvilinear shapes of leading edge 702 and of suction surface 708 facilitate reducing an airflow separation and a formation of one or more vortexes near leading edge 702. The curvilinear shape of trailing edge 704 reduces an airflow wake 710 as a first airflow 712 meets a second airflow 714 downstream of trailing edge 704. As such, a noise that may be generated by first airflow 712 and/or second airflow 714 is reduced. In other respects, aft blade extension 700 operates in a similar manner as aft blade extension 302 (shown in FIG. 4).

The above-described embodiments facilitate providing an efficient and cost-effective increase in wind turbine power generation. The forward blade extension and the aft blade extension create additional lift and reduce airflow separation along the wind turbine blade. As such, more power may be captured at a given wind speed due to the ability of the wind turbine blade to utilize a higher angle of attack. The forward blade extension and aft blade extension described herein facilitate a reduction in size of wind turbine blades while still generating substantially the same power rating as larger conventional blades. This facilitates decreasing the weight and loading of a wind turbine and also facilitates decreasing the cost of the overall wind turbine system. Moreover, the forward blade extension and aft blade extension may be retracted during high wind speed events to facilitate protecting the wind turbine blades and wind turbine components.

Exemplary embodiments of a wind turbine, a lift generating apparatus, and a method for increasing lift induced to wind turbine blades are described above in detail. The wind turbine, lift generating apparatus, and method are not limited to the specific embodiments described herein, but rather, components of the wind turbine and/or lift generating apparatus and/or steps of the method may be utilized independently and separately from other components and/or steps described herein. For example, the lift generating apparatus may also be used in combination with other high lift systems and methods, and is not limited to practice with only the wind turbine and method as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lift generating apparatus for a wind turbine rotor blade comprising a first sidewall and an opposing second sidewall coupled together at a leading edge and at a trailing edge, said lift generating apparatus comprising:
   at least one forward blade extension coupled to the rotor blade to define a first airflow channel between said forward blade extension and the rotor blade; and,
   at least one aft blade extension coupled to the rotor blade to define a second airflow channel between said aft blade extension and the rotor blade,
   wherein the rotor blade has an airfoil-shaped aerodynamic profile, the second sidewall of the rotor blade defines a pressure surface, and the aft blade extension is positioned such that at least a portion of a suction surface of the aft blade extension extends along the pressure surface of the rotor blade,
   wherein the first sidewall defines a suction surface, said forward blade extension extends along at least a portion of the suction surface, and
   wherein said second airflow channel comprises an inlet and has a cross-sectional width that is substantially constant from said inlet to the trailing edge and the rotor blade has a cross-section and a centerline of the cross-section, said forward blade extension extends along the suction surface past the centerline and towards the trailing edge.

2. A lift generating apparatus in accordance with claim 1, wherein said forward blade extension, said aft blade extension, and the rotor blade together form a substantial airfoil-shaped aerodynamic profile.

3. A lift generating apparatus in accordance with claim 1, wherein a leading edge portion of the suction surface of the aft blade extension is positioned between a trailing edge of the rotor blade and a centerline of the rotor blade.

4. A lift generating apparatus in accordance with claim 1, wherein said first airflow channel comprises an outlet and has a cross-sectional width that is substantially constant from the leading edge to said outlet.

5. A lift generating apparatus in accordance with claim 1, wherein at least one of said forward blade extension and said aft blade extension is movable with respect to the rotor blade.

6. A lift generating apparatus in accordance with claim 1, wherein the portion of the suction surface of the aft blade extension is formed in a shape that corresponds to the pressure surface of the rotor blade.

7. A wind turbine, comprising:
   a tower, a nacelle coupled to said tower, and a rotor rotatably coupled to said nacelle, said rotor comprising:
      at least one blade comprising a first sidewall and an opposing second sidewall coupled together at a leading edge and at a trailing edge;

at least one forward blade extension coupled to said blade to define a first airflow channel between said forward blade extension and said blade; and at least one aft blade extension coupled to said blade to define a second airflow channel between said aft blade extension and said blade, wherein said second airflow channel comprises an inlet and has a cross-sectional width that is substantially constant from said inlet to the trailing edge and said blade has a cross-section and a centerline of the cross-section, said forward blade extension extends along said suction surface past the centerline towards said trailing edge.

8. A wind turbine in accordance with claim 7, wherein said forward blade extension, said aft blade extension, and said blade together form a substantial airfoil-shaped aerodynamic profile.

9. A wind turbine in accordance with claim 7, wherein said first sidewall defines a suction surface, said forward blade extension extends along at least a portion of said suction surface.

10. A wind turbine in accordance with claim 7, wherein said second sidewall defines a pressure surface, said aft blade extension extends along at least a portion of said pressure surface.

11. A wind turbine in accordance with claim 7, wherein said first airflow channel comprises an outlet and has a cross-sectional width that is substantially constant from said leading edge to said outlet.

12. A wind turbine in accordance with claim 7, wherein at least one of said forward blade extension and said aft blade extension is movable with respect to said blade.

13. A method for assembling a wind turbine, said method comprising:

coupling at least one forward blade extension to at least one blade having a first sidewall and an opposing second sidewall coupled together at a leading edge and at a trailing edge, to define a first airflow channel between the forward blade extension and the blade;

coupling at least one aft blade extension to the blade to define a second airflow channel between the aft blade extension and the blade to define the second airflow channel having a substantially constant cross-sectional width from an inlet of the second airflow channel to the trailing edge;

wherein and said blade has a cross-section and a centerline of the cross-section, said forward blade extension is coupled to the blade such that the forward blade extension extends along said suction surface past the centerline towards said trailing edge; and, coupling the blade to the wind turbine.

14. A method in accordance with claim 13, wherein the blade has a suction surface and a pressure surface, said method further comprises extending the forward blade extension along at least a portion of the suction surface.

15. A method in accordance with claim 14, further comprising extending the aft blade extension along at least a portion of the pressure surface.

16. A method in accordance with claim 13, further comprising:

coupling the forward blade extension to the blade to define the first airflow channel having a substantially constant cross-sectional width.

* * * * *